United States Patent
Tom et al.

(10) Patent No.: US 6,764,755 B2
(45) Date of Patent: *Jul. 20, 2004

(54) CHANNELIZED SORBENT MEDIA, AND METHODS OF MAKING SAME

(75) Inventors: Glenn M. Tom, New Milford, CT (US); Steven J. Hultquist, Chapel Hill, NC (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/023,493

(22) Filed: Dec. 17, 2001

(65) Prior Publication Data

US 2003/0113538 A1 Jun. 19, 2003

(51) Int. Cl.[7] .............................. B32B 5/16; B32B 3/00; B01J 20/02; B01J 20/10; B01J 20/20
(52) U.S. Cl. ..................... 428/304.4; 95/90; 95/92; 95/95; 95/149; 95/900; 95/901; 95/903; 96/108; 96/121; 96/122; 428/314.2; 428/313.3; 428/313.9; 428/402; 502/400; 502/401; 502/402; 502/407; 502/415; 502/416; 502/527.19; 502/527.24
(58) Field of Search ...................... 428/304.4, 314.2, 428/313.3, 313.9, 402, 402.21; 95/90, 95, 96, 902, 900, 903, 901; 96/108, 121, 122; 502/400, 401, 402, 407, 414, 415, 416, 527.19, 527.24; 423/414; 427/212, 221

(56) References Cited

U.S. PATENT DOCUMENTS

| 5,104,530 A | * | 4/1992 | Maroldo et al. | 210/198.2 |
| 5,518,528 A | | 5/1996 | Tom et al. | 95/95 |
| 5,704,965 A | | 1/1998 | Tom et al. | 95/95 |
| 5,851,270 A | | 12/1998 | Olander | 96/149 |
| 6,398,962 B1 | * | 6/2002 | Cabrera et al. | 210/635 |

FOREIGN PATENT DOCUMENTS

WO    WO 98/58253    * 12/1998

* cited by examiner

*Primary Examiner*—H. Thile
(74) *Attorney, Agent, or Firm*—Margaret Chappuis; William F. Ryann; Steven J. Hultquist

(57) ABSTRACT

A channelized sorbent material comprises porous sorbent particles characterized by an average pore diameter. Each sorbent particle has at least one interior channel of an average transverse dimension (i.e. transverse diameter) that is at least ten times larger than the average pore diameter of the porous sorbent particle. The interior channel may constitute a single cylindrical through-bore in the sorbent particle, or alternatively, an array of intersecting or non-intersecting channels. The porous sorbent particles preferably comprise bead activated carbon particles. Such channelized sorbent material is particular useful as sorbent media in an adsorption-desorption apparatus for storage and dispensing of a sorbable fluid.

33 Claims, 4 Drawing Sheets

CHANNELIZED SORBENT MEDIA, AND METHODS OF MAKING SAME

BACKGROUND OF THE INVENTION

1. Field of the Invention

The present invention relates to channelized sorbent material, and to methods of making and using the same.

2. Description of the Related Art

Sorbent materials of widely varying types are used in a correspondingly wide variety of industrial applications.

Examples include chemisorbent materials that are used to chemically react with impurity fluid species, for abatement of the impurity species in the fluid medium being treated, as well as physical sorbent materials that are employed to reversibly take up sorbable fluid species, e.g., for sorptive-based fluid and dispensing operations, as described in Tom et al. U.S. Pat. No. 5,518,528, and Tom et al. U.S. Pat. No. 5,704,965, the disclosures of which hereby are incorporated by reference in their respective entireties for all purposes.

The sorbent materials are frequently in the form of porous particles, having micro-pores of about 2 to 200 Å in diameter. The small-dimensioned porosity of the sorbent materials beneficially provides a correspondingly large surface area (typically measured in units of meters$^2$/gram) per unit weight of the sorbent materials, with an associated large number of active sorption sites on and in the sorbent materials. At the same time, dimensions of the porosity in the sorbent materials have significant impacts upon diffusion rates of fluid species through such sorbent materials. Generally, diffusion rates of fluid species in a sorbent medium are determined by the mean free path length of the fluid molecules being sorptively taken up by such sorbent medium. The smaller the pores in such sorbent medium, the longer the mean free path length, and the slower the diffusion rates. Therefore, the small dimensions of porosity in conventional sorbent materials deleteriously constrain the ingress (in the case of irreversible chemical adsorption) and both the ingress and the egress (in the case of reversible physical adsorption) of fluid species into or from the sorbent materials through the small-sized, highly tortuous passages of the porosity.

Diffusion in relation to convective or bulk hydrodynamic flow is very slow in character due to the diffusion resistance caused by the small porosity of conventional sorbent materials. Particularly in reversible physical adsorption processes, such as in pressure swing and/or thermal swing adsorption processes wherein it is desired to separate a feed gas mixture to produce a purified or separated product, or in sorptive-based gas storage and dispensing applications in which it is desired to rapidly discharge the stored gas from the sorbent when the supply vessel flow control valve is opened, the diffusional resistance to extracting fluid from the sorbent medium imposes a significant constraint upon adsorption/desorption rates.

One method of countering the diffusional resistance of sorbent material in a fluid storage and dispensing vessel is described in U.S. Pat. No. 5,851,270 issued Dec. 22, 1998 to W. Karl Olander. In one approach described in this patent, an inert (non-sorptive) particulate material is interspersed with the active particulate sorbent particles, to combat resorption of previously desorbed fluid or interstitial fluid by the sorbent medium while such fluid flows out of the vessel to the dispensing assembly coupled to the vessel.

Another approach described in the same patent is the deployment of a porous diffusion tube for extraction of desorbed or interstitial gas. In such approach, the diffusion tube is arranged in the bed so that gas entering the tube flows directly out of the vessel containing the sorbent bed. This arrangement avoids further sorbent contact of desorbed gas entering the tube, which otherwise would result in repeated sorption/desorption/resorption/desorption during passage of fluid molecules through the bulk volume of the sorbent bed to the exit port of the vessel.

There is a continuing need in the art for improvements in the use and deployment of sorbent materials, particularly in respect of reducing diffusional resistance and increasing diffusion rates of fluid species in sorbent materials.

SUMMARY OF THE INVENTION

The present invention relates to channelized sorbent particles as well as to methods of making and using the same, wherein the sorbent particles have interior channels for facilitating ingress/egress of fluid into/from the porosity in the interior volume of such sorbent particles.

One aspect of the present invention relates to a channelized sorbent material having an average pore diameter and comprising sorbent particles having one or more interior channels, and wherein the interior channels have a transverse diameter at least one order of magnitude (10x) larger than the average pore diameter of the channelized sorbent material.

Another aspect of the present invention relates to a method for forming the channelized sorbent material as described above, comprising the steps of providing a sorbent precursor material, coating such sorbent precursor material around removable solid core bodies to form sorbent precursor particles, removing the removable solid core bodies to produce channelized sorbent precursor particles, and then converting the channelized sorbent precursor particles into channelized sorbent particles.

In a specific aspect, the present invention relates to a solid-phase porous sorbent material having an average pore diameter, wherein the solid-phase porous sorbent material comprises sorbent particles having one or more interior channels, and wherein the interior channels have an average transverse dimension at least one order of magnitude (10x) larger than the average pore diameter of the solid-phase porous sorbent material.

Such solid-phase porous sorbent material can be used in an adsorption-desorption apparatus for storage and dispensing of a sorbable fluid. Such an adsorption-desorption apparatus may for example include:

(a) a storage and dispensing vessel constructed and arranged for holding a solid-phase porous sorbent material, and for selectively flowing fluid in and out of the vessel;

(b) a channelized solid-phase porous sorbent material as described above, disposed in the storage and dispensing vessel at an interior gas pressure;

(c) a sorbable fluid adsorbed on the solid-phase porous sorbent material; and (d) a dispensing assembly coupled in gas flow communication with the storage and dispensing vessel.

The dispensing assembly of such adsorption-desorption apparatus may be constructed and arranged:

(i) to provide, exteriorly of the storage and dispensing vessel, a pressure below the interior pressure, to effect desorption of sorbable fluid from the solid-phase porous sorbent material and flow of desorbed fluid through the dispensing assembly; and/or (ii) to flow thermally desorbed fluid therethrough, wherein said dispensing assembly comprises means for heating the solid-phase porous sorbent material to effect thermal desorption of the fluid therefrom, so that the desorbed fluid flows from the vessel into the dispensing assembly, The solid-phase porous sorbent material of the present invention may comprise any suitable material in any suitable shape. It may comprise, for example, silica, carbon molecular sieves, alumina, macroreticulate polymers, kieselguhr, carbon, and aluminosilicates. Preferred solid-phase sorbent materials include activated carbon materials.

Another aspect of the present invention relates to methods of making a channelized solid-phase porous sorbent material, including mechanically, chemically, or energetically forming one or more channels in a solid-phase porous sorbent material.

In one embodiment of the present invention, a channelized porous carbon sorbent material is manufactured by a method including the steps of:

(a) providing a pyrolyzable carbonaceous resin;

(b) coating the pyrolyzable carbonaceous resin on channel core bodies of a solid core material to form resin particles having coated cores, wherein said solid core material is insoluble in the pyrolyzable carbonaceous resin but is removable from the resin particles after their formation;

(c) removing the channel core bodies from the resin particles to form channelized resin particles having interior channels in the resin particles of the pyrolyzable carbonaceous resin; and (d) pyrolyzing the channelized resin particles to produce corresponding channelized activated carbon particles.

Other aspects, features and embodiments of the invention will be more fully apparent from the ensuing disclosure and appended claims.

DETAILED DESCRIPTION OF THE INVENTION AND PREFERRED EMBODIMENTS THEREOF

The present invention represents a simple but fundamental departure from the conventional wisdom in the manufacture and deployment of sorbent materials.

This conventional wisdom holds that it is desirable, from the perspective of maximizing the surface area of a sorbent medium (for fluid contacting and interaction) and achieving a high surface-to-volume ratio, to provide small-sized particles of the sorbent medium that are highly porous in character.

Nonetheless, the smaller the sorbent particles, the more closely packed is a corresponding sorbent bed composed of such sorbent particles. This results in a larger pressure drop through the sorbent bed during its active operation, and the consequent need for correspondingly fluid-driving devices (pumps, blowers, compressors, etc.) of larger size and higher capacity. This in turn raises the likelihood of bypassing, channeling and other anomalous flow behavior in the sorbent bed during the active operation.

The present invention relates to a channelized particulate sorbent, in which the sorbent particles have interior channels therein to facilitate ingress/egress of fluid into/from the porosity in the interior volume of the particles.

The transverse dimension of the interior channel(s) is at least one order of magnitude (10×) larger than the average pore diameter of porosity in the sorbent particles. Specifically, The length of the interior channel(s) is a length that communicates an interior volume (i.e. pores) of a sorbent particle with an exterior surface of such sorbent particle, and transverse dimension of such channel(s) is measured along a direction transverse to the length of such channel(s). The transverse dimension of the interior channel(s) (i.e. transverse to the direction of gas passage therethrough) may for example be at least 25, 40, 50, 100, 250, 500, 1000, 5000, or more times larger than such average pore size of the sorbent particles in various respective embodiments of the invention. The transverse dimension of the channel(s) in the sorbent particle generally does not exceed about 50,000 times larger than the average pore diameter of the particle, and maybe less than any of the aforementioned numerical values (25, 40, 50, etc.) in a range bounded by smaller and larger values defining a useful range of transverse dimension of the interior channel(s) in the sorbent particle. Such interior channels of comparatively larger dimensions provide enlarged and shorter diffusion paths communicating the interior volumes with the exterior surfaces of the respective sorbent particles.

In a preferred aspect, the interior channels are cylindrically shaped bores through the sorbent particles.

The interior channels may be as simple as a single cylindrical through-bore channel in a sorbent particle, or alternatively may constitute an array of channels (e.g., of intersecting or non-intersecting character) in the sorbent particle.

Figure 1:
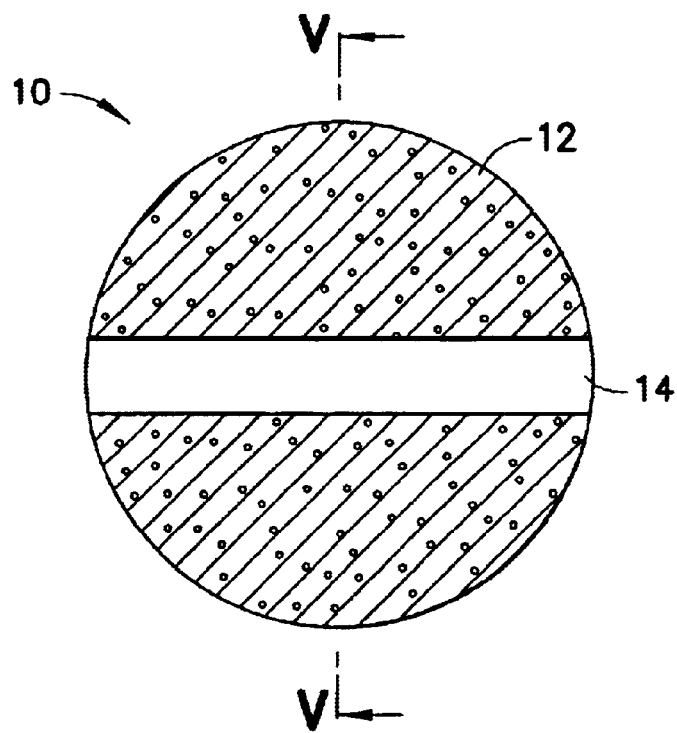
FIG. 1 is a cross-sectional view of a generally spherical sorbent particle having a single interior channel constituted by a cylindrical through-bore.

FIG. 1 is a cross-sectional view of a generally spherical sorbent particle 10. The sorbent particle 10 comprises a porous particle body 12 having a single interior channel 14 therein in the shape of a cylindrical through-bore.

Figure 2:
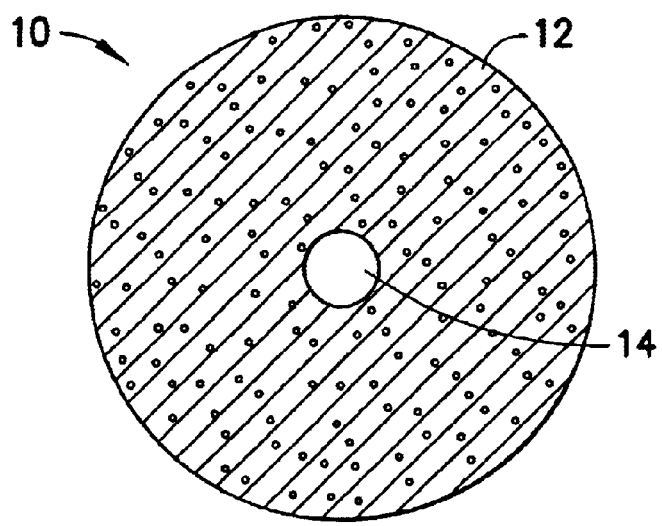
FIG. 2 is a transverse-sectional view of the sorbent particle in FIG. 1 along line V—V thereof.

FIG. 2 is a transverse-sectional view of the sorbent particle 10 of FIG. 1 along line V—V thereof, showing the porous particle body 12 and the cylindrical channel 14 therein.

Figure 3:
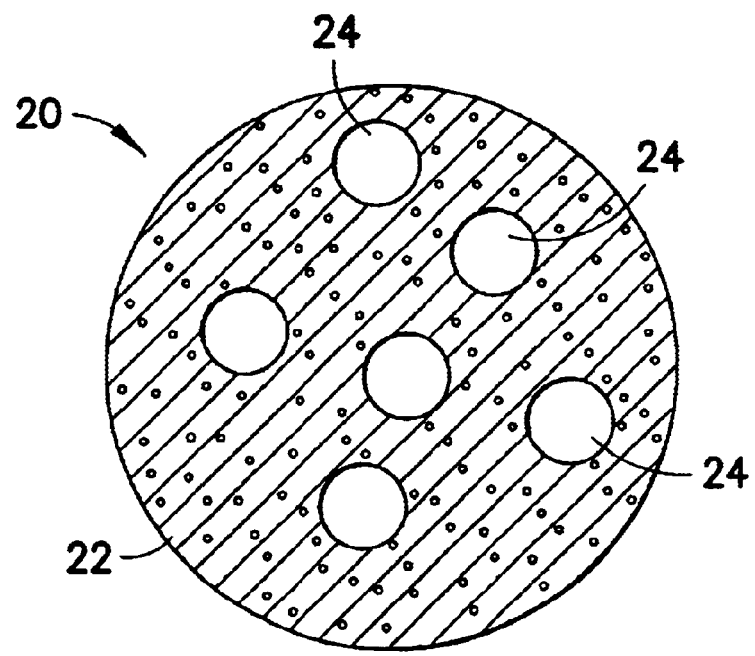
FIG. 3 is a transverse-sectional view of a generally spherical sorbent particle having multiple interior channels therein.

FIG. 3 is a transverse-sectional view of a generally spherical sorbent particle 20, having a spherical porous particle body 22 and multiple interior channels 24 therein.

Figure 4:
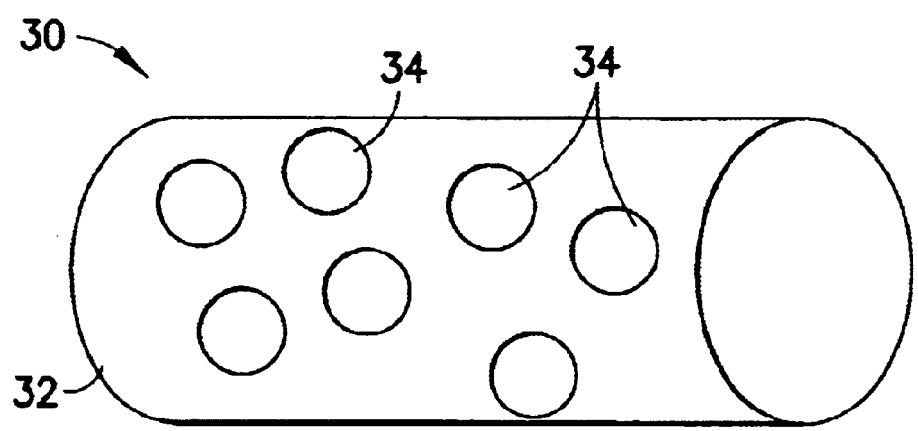
FIG. 4 is a side view of a cylindrical sorbent particle having interior channels with surface openings.

FIG. 4 shows another illustrative sorbent particle 30, having a cylindrical porous particle body 32 with multiple interior channels 34 therein.

Figure 5:
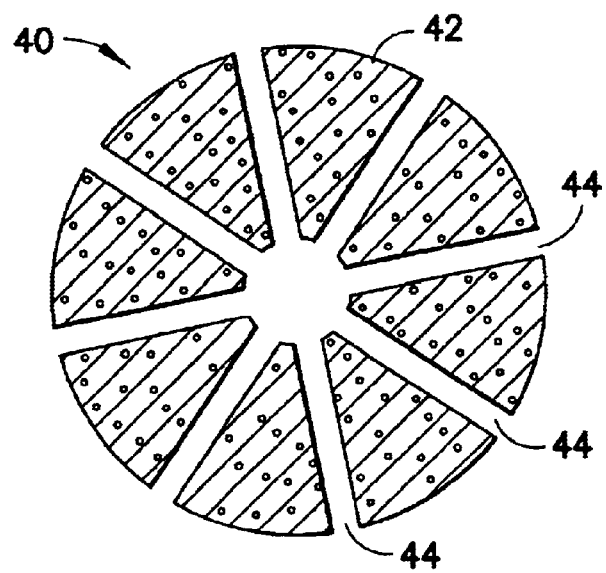
FIG. 5 is a cross-sectional view of a spherical sorbent particle with an array of channels connecting the surface of such particle with its interior volume.

FIG. 5 shows a cross-sectional view of a spherical sorbent 40 particle having a porous particle body 42 and multiple intersecting interior channels 44 therein for communicating the interior volume of the particle body 42 with its surface.

Figure 6:
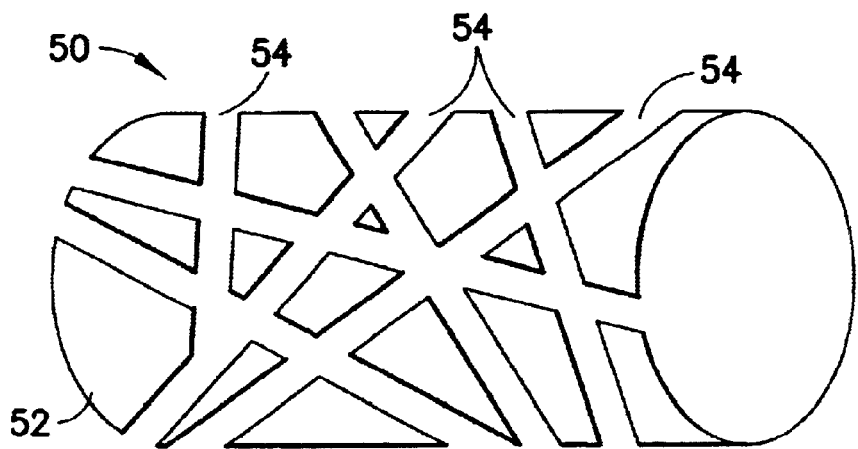
FIG. 6 is a schematic perspective view of a cylindrical sorbent particle with an array of intersecting channels therein.

FIG. 6 is a schematic perspective view of a cylindrical sorbent particle 50 having a particle body 52 with multiple intersecting interior channels 54 therein.

The interior channels in the transverse dimension thereof are at least 10, and in specific embodiments may be at least 100, 1000, or 10000, times larger than the average diameter of pores in the sorbent particles. The interior channels thus are significantly distinguished in size from the naturally existing micro-pores in the sorbent particles, so as to provide enlarged fluid diffusion passages in the sorbent particle bed and to facilitate ingress/egress of fluid species therethrough.

Quantitatively, porosity in physical adsorbent and chemisorbent materials is conventionally measured in Angstrom (or nanometer) up to micrometer units, and thus is several orders of magnitude smaller than the particle size of the sorbent particles. Average pore diameter in the sorbent particles is typically in the range of from about 2 Angstroms to about 200 Angstroms. Certain finely divided sorbent particles have average pore diameter in the range from about 2 to about 100 Angstroms, or even in the range from about 2 to about 20 Angstroms. Such porosity typically is highly tortuous in character.

Providing interior channels at least one order of magnitude larger, or several orders of magnitude larger in transverse dimensions than the porosity of the sorbent materials effectively reduces the diffusional resistance that constrains ingress/egress of the fluid species into/from the sorbent bed.

For example, for sorbent particles having an average pore diameter of 10 Angstroms, the interior channels in the sorbent particles are at least 100 Angstroms in diameter, and preferably are in a range of from about 1000 Angstroms to about 100,000 Angstroms in diameter. The length of such channels is desirably at least equal to the diameter of the channel, and as long as necessary to communicate the interior volume of the sorbent particle with its exterior surface.

The sorbent particles may be in any suitable shape, including but not limited to, beads, cylinders, granules, flakes, platelets, pellets, tablets, sheets, rods, helixes, extrudates, cloth, curviform, web form materials, honeycomb matrix monolith, or of any other conformation, or comminuted and crushed forms of these conformations, depending on the process of manufacture. It is to be understand that although FIGS. 1–6 illustrative show sorbent particles having regular geometric (i.e. spherical and cylindrical) forms, the forms and shapes of such sorbent particles are not thus limited. The particles can be of any regular or irregular conformation, as long as they are sorptively effective and otherwise suitable for the purposes of practicing the present invention.

The sorbent particles may comprise any suitable sorbent material, having an affinity for a sorbate fluid. Such sorbent material may for example be formed of silica, carbon molecular sieves, alumina, macroreticulate polymers, kieselguhr, carbon, aluminosilicates, etc.

In one preferred embodiment of the present invention, the sorbent material comprises an activated carbon material, e.g., in a bead shape.

Bead activated carbon sorbent particles generally are at least 0.1 millimeter in length or equivalent diameter, but typically do not exceed 3 centimeters. For example, they may have an average particle diameter in the range from about 1 millimeter to about 1 centimeter. Particularly fine bead activated carbon particles may have average particle diameter in a range of from about 3 to about 6 millimeters.

In another embodiment of the present invention, the sorbent material comprises a molecular sieve adsorbent having a cylindrical extruded shape of 8–10 millimeters in length and a diameter of 2–4 millimeters.

The channelized sorbent materials of the present invention may be used in any suitable applications, e.g., in a scrubber or other adsorption apparatus.

Figure 7:
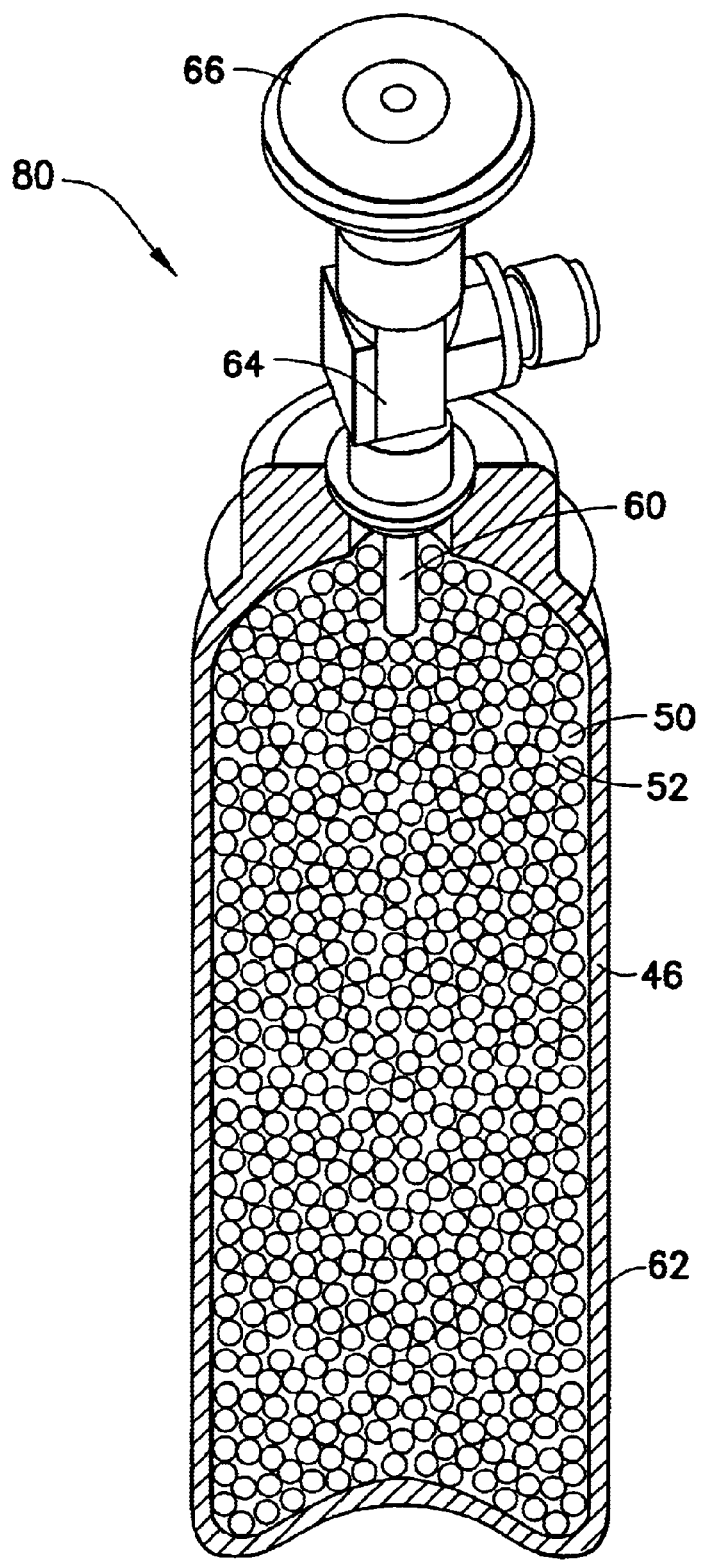
FIG. 7 is a perspective view, in partial cross-section, of an adsorption-desorption apparatus including a channelized sorbent material according to the present invention.

In one preferred embodiment of the present invention, the channelized sorbent material is incorporated in an adsorption-desorption apparatus 80 of a type as shown in FIG. 7, for storage and dispensing of a sorbable fluid.

Referring to FIG. 7, the fluid vessel 62 comprises a wall 46 enclosing an interior volume 52 of the vessel, and containing a channelized adsorbent material 50 as described hereinabove. The upper end of the fluid vessel 62 is joined to a valve head 64 coupled with a manual valve actuator wheel 66 for opening and closing the valve head. A porous sintered metal tube 60, or other foraminous or otherwise gas-permeable structure serving to prevent entrainment in the dispensed fluid of particulate solids from the bed of the adsorbent material, may be advantageously provided.

The channels can be formed in the sorbent particles in any suitable manner, Illustrative channel forming methods include laser drilling of bore holes in the sorbent particles, micromachining of channels, ablation, sublimation, electromachining, dissolution or etching of material from the sorbent particle, or in situ channelization of the particle during its formation.

One preferred method of forming a channelized sorbent material includes the steps of forming a removable channel core body on which the raw sorbent material is coated. Following drying or "setting" of the sorbent material, the channel core body is removed by physical processing such as volatilization (sublimation), melt extraction, solubilization, etc., or chemical processing such as etching to yield the channelized sorbent material as a product.

In application to fabrication of channelized activated carbon sorbent material, the following process steps may be employed: (a) providing a pyrolyzable carbonaceous resin; (b) coating the pyrolyzable carbonaceous resin over channel core bodies of a solid core material to form resin particles having coated cores; (c) removing the channel core bodies from the resin particles, leaving interior channels in such resin particles; and (d) pyrolyzing the channelized resin particles to convert same into channelized activated carbon particles.

Any suitable carbonaceous resin that is pyrolyzable can be used for the purpose of practicing the present invention. Examples of useful carbonaceous resins include, but are not limited to, polyacrylontrile, furfuryl alcohol, resorcinol, phenol, catechol, and phloroglucinol. Preferred resin materials include acrylic resins, e.g., polyacrylontrile.

The solid core material constituting the channel core bodies must be removable from the carbonaceous resin without damaging the resin particles or preventing pyrolysis of the resin. For example, the solid core material can be volatilizable, so that it can be removed from the carbonaceous resin by sublimation; the solid core material can be meltable and extracted (upon melting) from the carbonaceous resin; the solid core material can be soluble, and removable by a solvent from the carbonaceous resin; or the solid core material can be differentially chemically reactive (i.e. etchable) in relation to the carbonaceous resin, so that the core material is removable from the resin by a chemical etchant that is non-reactive with the resin. It is desirable for such purposes that the solid core material is highly insoluble in the pyrolyzable carbonaceous resin in forming the desired channels therein.

The solid core material may include, but is not limited to, ammonium salts, copper acetylacetone, hexachloroethane, potassium amide, ferrous chloride, wax, and camphor. One particularly preferred solid core material comprises ammonium carbonate.

The channel core bodies of the solid core material may be of any desired shape or form, consistent with that of the interior channels formed therefrom. Dendritic forms of suitable material can be useful in such respect, for yielding multiple channels from the interior volume of the sorbent particle to its surface, as shown in FIG. 5.

Alternatively, the interior channels can be formed by a matrix of agglomerated or otherwise consolidated core body elements, to form a corresponding multi-channeled sorbent particle having intersecting interior channels as in FIG. 6.

Fluidized bed processing for the pyrolyzable resin coating, volatilization, and pyrolysis steps provides a methodology amenable to scale-up and high-volume operation.

Although the invention has been variously disclosed herein with reference to illustrative aspects, embodiments and features, it will be appreciated that the aspects, embodiments and features described hereinabove are not intended to limit the invention, and that other variations, modifications and other embodiments will be readily apparent to those of ordinary skill in the art. The invention therefore is to be broadly construed, consistent with the claims hereafter set forth.

What is claimed is:

1. A solid-phase porous sorbent material having an average pore diameter, wherein said solid-phase porous sorbent material comprises sorbent particles having at least one interior through-bore channel therein and wherein said interior channel has an average transverse dimension at least one order of magnitude (10×) larger than said average pore diameter of said solid-phase porous sorbent material.

2. The solid-phase porous sorbent material of claim 1, wherein said interior channels have an average diameter at least two orders of magnitude (100×) larger than the average pore diameter of said solid-phase porous sorbent material.

3. The solid-phase porous sorbent material of claim 1, wherein said interior channels have an average diameter at least three orders of magnitude (1000×) larger than the average pore diameter of said solid-phase porous sorbent material.

4. The solid-phase porous sorbent material of claim 1, wherein said interior channels have an average diameter at least four orders of magnitude (10000×) larger than the average pore diameter of said solid-phase porous sorbent material.

5. The solid-phase porous sorbent material of claim 1, having an average pore diameter in the range from about 2 Å to about 200 Å.

6. The solid-phase porous sorbent material of claim 1, having an average pore diameter in the range from about 2 Å to about 100 Å.

7. The solid-phase porous sorbent material of claim 1, wherein the sorbent particles have a conformation selected from the group consisting of beads, cylinders, granules, flakes, platelets, pellets, tablets, sheets, rods, helixes, extrudates, cloth, curviform, web form materials, honeycomb matrix monolith, and comminuted and crushed forms of said conformations.

8. The solid-phase porous sorbent material of claim 1, comprising a material selected from the group consisting of silica, carbon molecular sieves, alumina, macroreticulate polymers, kieselguhr, carbon, and aluminosilicates.

9. The solid-phase porous sorbent material of claim 1, comprising activated carbon material.

10. A method of forming a solid-phase porous sorbent material of claim 9, comprising the step of:
    (a) providing a pyrolyzable carbonaceous resin;
    (b) coating said pyrolyzable carbonaceous resin over channel core bodies of a solid core material to form resin particles having coated cores, wherein said solid core material is insoluble in said pyrolyzable carbonaceous resin but is removable from said resin;
    (c) removing said channel core bodies from the resin particles, leaving interior channels in said resin particles; and
    (d) pyrolyzing the channelized resin particles to convert such into channelized activated carbon particles.

11. The method of claim 10, wherein the pyrolyzable carbonaceous resin is selected from the group consisting of polyacrylontrile, furfuryl alcohol, resorcinol, phenol, catechol, and phloroglucinol.

12. The method of claim 11, wherein the pyrolyzable carbonaceous resin comprises polyacrylontrile.

13. The method of claim 10, wherein the solid core material comprises a volatilizable material selected from the group consisting of ammonium salts, copper acetylacetone, hexachloroethane, potassium amide, ferrous chloride, wax, and camphor.

14. The method of claim 10, wherein the solid core material comprises ammonium carbonate.

15. The method of claim 10, wherein the solid core material comprises a meltable material.

16. The method of claim 10, wherein the solid core material comprises a soluble material.

17. The method of claim 10, wherein the solid core material comprises an etchable material.

18. The method of claim 10, wherein the channel core bodies of said solid core material have a conformation selected from the group consisting of cylinders, rods, dendrites, granules, flakes, helixes, and combinations thereof.

19. The solid-phase porous sorbent material of claim 1, comprising a bead activated carbon material.

20. The solid-phase porous sorbent material of claim 19, wherein said bead activated carbon material has an average particle diameter in the range from about 0.1 millimeter to about 3 centimeters.

21. The solid-phase porous sorbent material of claim 19, wherein said bead activated carbon material has an average particle diameter in the range from about 1 millimeter to about 1 centimeter.

22. The solid-phase porous sorbent material of claim 19, wherein said bead activated carbon material has an average particle diameter in the range from about 3 millimeters to about 6 millimeters.

23. The solid-phase porous sorbent material of claim 1, comprising carbon molecular sieves having a cylindrical extruded shape, characterized by an average length in the range from about 8 millimeters to about 10 millimeters and an average diameter in the range from about 2 millimeters to about 4 millimeters.

24. The solid-phase porous sorbent material of claim 1, wherein the interior channels of said porous sorbent particles are cylindrical bores through said sorbent particles.

25. The solid-phase porous sorbent material of claim 1, wherein each of said sorbent particles comprises an array of interior channels.

26. A channelized sorbent material having an average pore diameter, wherein said channelized sorbent material comprises sorbent particles having one or more interior through-bore-channels, and wherein said interior channels have a transverse diameter at least one order of magnitude (10×) larger than the average pore diameter of said channelized sorbent material.

27. A method for forming the channelized sorbent material of claim 26, comprising the steps of providing a sorbent precursor material, coating such sorbent precursor material around removable solid core bodies to form sorbent precursor particles, removing the removable solid core bodies to produce channelized sorbent precursor particles, and converting the channelized sorbent precursor particles into channelized sorbent particles.

28. An adsorption-desorption apparatus, for storage and dispensing of a sorbable fluid, said apparatus comprising:
  (a) a storage and dispensing vessel constructed and arranged for holding a solid-phase porous sorbent material, and for selectively flowing fluid in and out of said vessel;
  (b) a channelized solid-phase porous sorbent material, disposed in said storage and dispensing vessel at an interior gas pressure, wherein said solid-phase porous sorbent material has an average pore diameter and comprises sorbent particles having at least one interior channel, and wherein said interior channel has an average transverse dimension at least one order of magnitude (10×) larger than the average pore diameter of said solid-phase porous sorbent material;
  (c) a sorbable fluid adsorbed on said solid-phase porous sorbent material; and
  (d) a dispensing assembly coupled in gas flow communication with the storage and dispensing vessel.

29. The adsorption-desorption apparatus of claim 28, wherein the dispensing assembly is constructed and arranged:
  (i) to provide, exteriorly of said storage and dispensing vessel, a pressure below said interior pressure, to effect desorption of sorbable fluid from the solid-phase porous sorbent material and flow of desorbed fluid through the dispensing assembly; and/or
  (ii) to flow thermally desorbed fluid therethrough, wherein said dispensing assembly comprises mans for healing the solid-phase porous sorbent material to effect thermal desorption of the fluid therefrom, so that the desorbed fluid flows from the vessel into the dispensing assembly.

30. The adsorption-desorption apparatus of claim 28, wherein the sorbent particles of the solid-phase porous sorbent material have a conformation selected from the group consisting of beads, cylinders, granules, flukes, platelets, pellets, tablets, sheets, rods, helixes, extrudates, cloth, curviform, web form materials, honeycomb matrix monolith, and comminuted and crushed forms of said conformations.

31. The adsorption-desorption apparatus of claim 28, wherein the solid-phase porous sorbent material comprises a material selected from the group consisting of silica, carbon molecular sieves, alumina, macroreticulate polymers, kieselguhr, carbon, and aluminosilicates.

32. The adsorption-desorption apparatus of claim 28, wherein the solid-phase porous sorbent material comprises activated carbon material.

33. The adsorption-desorption apparatus of claim 28, wherein the solid-phase porous sorbent material comprises a bead activated carbon material.

* * * * *